United States Patent
Yerli

(10) Patent No.: US 12,088,886 B2
(45) Date of Patent: Sep. 10, 2024

(54) SYSTEM AND METHOD ENABLING PRIVATE TO PUBLIC MEDIA EXPERIENCES

(71) Applicant: TMRW Foundation IP S. À R.L., Luxembourg (LU)

(72) Inventor: Cevat Yerli, Frankfurt am Main (DE)

(73) Assignee: TMRW Foundation IP S. À R.L., Luxembourg (LU)

( * ) Notice: Subject to any disclaimer, the term of this patent is extended or adjusted under 35 U.S.C. 154(b) by 0 days.

(21) Appl. No.: 17/722,235

(22) Filed: Apr. 15, 2022

(65) Prior Publication Data

US 2023/0336830 A1    Oct. 19, 2023

(51) Int. Cl.
*H04N 21/478* (2011.01)
*G06T 19/00* (2011.01)

(52) U.S. Cl.
CPC ......... *H04N 21/478* (2013.01); *G06T 19/003* (2013.01); *G06T 19/006* (2013.01)

(58) Field of Classification Search
CPC .... H04N 21/478; G06T 19/003; G06T 19/006
See application file for complete search history.

(56) References Cited

U.S. PATENT DOCUMENTS

| 8,799,219 B2 | 8/2014 | Silverman et al. |
| 2010/0214111 A1 | 8/2010 | Schuler et al. |
| 2012/0311451 A1 | 12/2012 | Beaven |
| 2017/0318335 A1 | 11/2017 | Ding et al. |
| 2019/0066387 A1 | 2/2019 | Grossmann et al. |
| 2019/0098370 A1 | 3/2019 | Laeuchli et al. |
| 2019/0278459 A1* | 9/2019 | da Costa ............ G06F 3/04815 |
| 2020/0402314 A1* | 12/2020 | Yerli ..................... H04N 7/157 |

FOREIGN PATENT DOCUMENTS

WO    2019/183593 A1    9/2019

* cited by examiner

*Primary Examiner* — Mulugeta Mengesha
(74) *Attorney, Agent, or Firm* — BRYAN CAVE LEIGHTON PAISNER LLP

(57) ABSTRACT

A system of enabling private to public media experiences comprises at least one server computer. The at least one server computer stores in memory a content management platform. The content management platform is configured to receive a media content creation command sent from a content creator device connected to the content management platform through a network; in response to receiving the media content creation command, generating a media content instance that is visible to and accessible by the content creator device but is not visible to or accessible by one or more other end user devices connected to the content management platform; receive, from the content creator device, a publishing command; and flag the media content instance to enable the media content instance to be publicly visible to and accessible by the one or more other end user devices.

20 Claims, 10 Drawing Sheets

SYSTEM AND METHOD ENABLING PRIVATE TO PUBLIC MEDIA EXPERIENCES

FIELD

The present disclosure relates generally to computer systems, and more specifically to a system and method enabling private to public media experiences.

BACKGROUND

Creation of media content is typically done in a private environment by locally downloading a computer application providing the media creation program and, after developing the media content, the developer may decide whether to publish the media content. Recent technological advances have allowed the development of the media content to be done online, directly on the "cloud". For example, the video platform YouTube™ enables users to upload and edit their videos online to their own channel and, when satisfied with any edits or adjustments, may decide to publish the video for everyone else to see.

However, for location-based media content, e.g., augmented reality media content, such a content creation is mostly either done offline on a local device that has downloaded the development program application, which may be resource-intensive for the local device, or is done online directly in the cloud, which may not give users the privacy that they may desire during the developmental stages. When developed locally, the media content is tailored for a single user experience and thus may not be available for other users unless uploaded to the network, which may take valuable time and may represent extra steps for the developer. When developed in the cloud, the media content may be directly available and visible to other users even during the developmental stages, such as when adding or modifying augmented reality assets, which may not be appropriate for the developers due to the lack of privacy. Furthermore, developers may be constrained to developing the augmented reality media content with a specific 3D engine from the native to the cloud server hosting the engine, which reduces the options and flexibility for the developers.

Thus, what is desired is a private media content development environment hosted in the cloud that may enable the development and publishing of the developed media content, while giving the developers the option to publish the media content in specific geospatial locations once the developer may be satisfied with the created assets.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One or more drawbacks described in the background may be solved by a system and method enabling private to public media experiences.

In some embodiments, a system of enabling private to public media experiences is provided. The system includes at least one server computer storing in memory a content management platform, the content management platform configured to receive a media content creation command sent from a content creator device connected to the content management platform through a network; in response to receiving the media content creation command, generating a media content instance that is visible to and accessible by the content creator device but is not visible to or accessible by one or more other end user devices connected to the content management platform; receive, from the content creator device, a publishing command; and flag the media content instance to enable the media content instance to be publicly visible to and accessible by the one or more other end user devices.

In some embodiments, the at least one server computer further stores in memory an engine platform configured to host one or more 3D engines that include at least one of an external 3D engine from a corresponding external engine server and a cloud 3D engine, where the media content instance is created using at least one of the one or more 3D engines. In some embodiments, the content management platform shares the media content instance with a media library, or positions the media content instance in a 3D coordinate of a virtual environment, or positions the media content instance in a 3D coordinate of a virtual world system connected to the content management platform. In some embodiments, the media content instance is viewed in an augmented reality presentation or a virtual reality presentation.

In some embodiments, the engine platform is further configured to request virtual frames from at least one of the one or more 3D engines, receive the virtual frames sent by at least one of the one or more 3D engines, and composite the virtual frames into a unified media stream view including the media content instance for presentation by at least the one or more other end user devices. In some embodiments, the engine platform is further configured to place the media content instance in a private media content software layer that is visible to the content creator device but not the one or more other end user devices, and in response to detecting the flagging of the media content instance, move the media content instance to a public media content software layer to make the media content instance publicly visible to and accessible by the one or more other end user devices. In some embodiments, the engine platform is further configured to render the media content instance invisible for the one or more other end user devices in a public media content software layer, and in response to detecting the flagging of the media content instance, rendering the media content instance visible for the one or more other end user devices.

In some embodiments, the content management platform enables at least one of the one or more other end user devices to edit the media content instance synchronously or asynchronously through the one or more 3D engines of the engine platform to enable co-creation of media content. In some embodiments, the virtual world system includes a plurality of virtual objects; where the virtual objects include virtual data and models, where the models comprise one or more of a 3D model, a dynamic model, a geometric model, and a machine learning model, and where the models consider a level of detail specified by a specific scenario computation.

In some embodiments, a method enabling private to public media experiences is provided. At least one server computer of a content management platform receives a media content creation command sent through a content creator device connected to the content management platform through a network. In response to receiving the media content creation command, a media content instance is generated that is visible to and accessible by the content creator device but is not visible to or accessible by one or more other end user devices connected to the content management platform. A publishing command is received from the content creator device. The media content instance is flagged to enable the media content instance to be publicly visible to and accessible by the one or more other end user devices.

The method may also include hosting, by the at least one server computer, one or more 3D engines that include at least one of an external 3D engine from a corresponding external engine server and a cloud 3D engine; where the media content instance is created using at least one of the one or more 3D engines. In some embodiments, the method further includes requesting virtual frames from at least one of the one or more 3D engines, receiving the virtual frames sent by at least one of the one or more 3D engines, and compositing the virtual frames into a unified media stream view including the media content instance for presentation by at least one of the one or more other end user devices. The method may also include placing the media content instance in a private media content software layer that is visible to the content creator device but not the one or more other end user devices, and in response to detecting the flagging of the media content instance, activating the private media content software layer to make the media content instance visible to and accessible by the one or more other end user devices. The method may further include rendering the media content instance invisible for the one or more other end user devices, placing the media content instance in a public media content software layer, and in response to detecting the flagging of the media content instance, rendering the media content instance visible to the one or more other end user devices.

In some embodiments, the method may also include enabling, by the at least one server computer, the one or more other end user devices to edit the media content instance synchronously or asynchronously through the one or more 3D engines to enable co-creation of media content. In some embodiments, the method may also include sharing the media content instance with a media library, or positioning the media content instance in a 3D coordinate of a virtual environment, or positioning the media content instance in a 3D coordinate of a virtual world system. In some embodiments, the virtual world system includes a plurality of virtual objects; where the virtual objects include virtual data and models, where the models comprise one or more of a 3D model, a dynamic model, a geometric model, and a machine learning model, and where the models consider a level of detail specified by a specific scenario computation.

In some embodiments, at least one non-transitory computer-readable medium is provided. The computer-readable medium has stored thereon computer code configured to cause at least one server computer to perform actions including receiving, by the at least one server computer of a content management platform, a media content creation command sent through a content creator device connected to the content management platform through a network; in response to receiving the media content creation command, generating a media content instance that is visible to and accessible by the content creator device but is not visible to or accessible by one or more other end user devices connected to the content management platform; receiving, from the content creator device, a publishing command; and flagging the media content instance to enable the media content instance to be publicly visible to and accessible by the one or more other end user devices.

In some embodiments, the actions may further include hosting, by the at least one server computer, one or more 3D engines that include at least one of an external 3D engine from a corresponding external engine server and a cloud 3D engine; where the media content instance is created using at least one of the one or more 3D engines. In some embodiments, the actions may further include enabling, by the at least one server computer, the one or more other end user devices to edit the media content instance synchronously or asynchronously through the one or more 3D engines to enable co-creation of media content.

Computer-readable media having stored thereon instructions configured to cause one or more computers to perform any of the methods described herein are also described.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages of the present invention will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

The current disclosure describes a system and a method enabling private to public media experiences. A media content item providing such media experiences may be, for example, digital audio, digital video, digital images, games, applications, and the like. Preferably, the media content may be a location-based media content that may be configured in one or more three-dimensional coordinates by being superposed on a real-world surface captured and/or stored in memory. For example, the media content item may be virtually positioned on a scanned surface, or on a stored virtual environment, or on a stored virtual world system. The system and method enable developers to create media content in a private space hosted online in one or more cloud server computers and, once the developers may be satisfied with the created media content, the system and method may enable publishing the created media content for access by end users, providing development privacy and publishing flexibility to developers and improving their user experience. Access by end users may further include enabling editing permissions to allow and promote cocreation of media content. Furthermore, the system and method enable using a platform that connects a plurality of 3D engines for the creation of the media content, increasing the media content creation capabilities and flexibility for content developers.

Figure 1A:
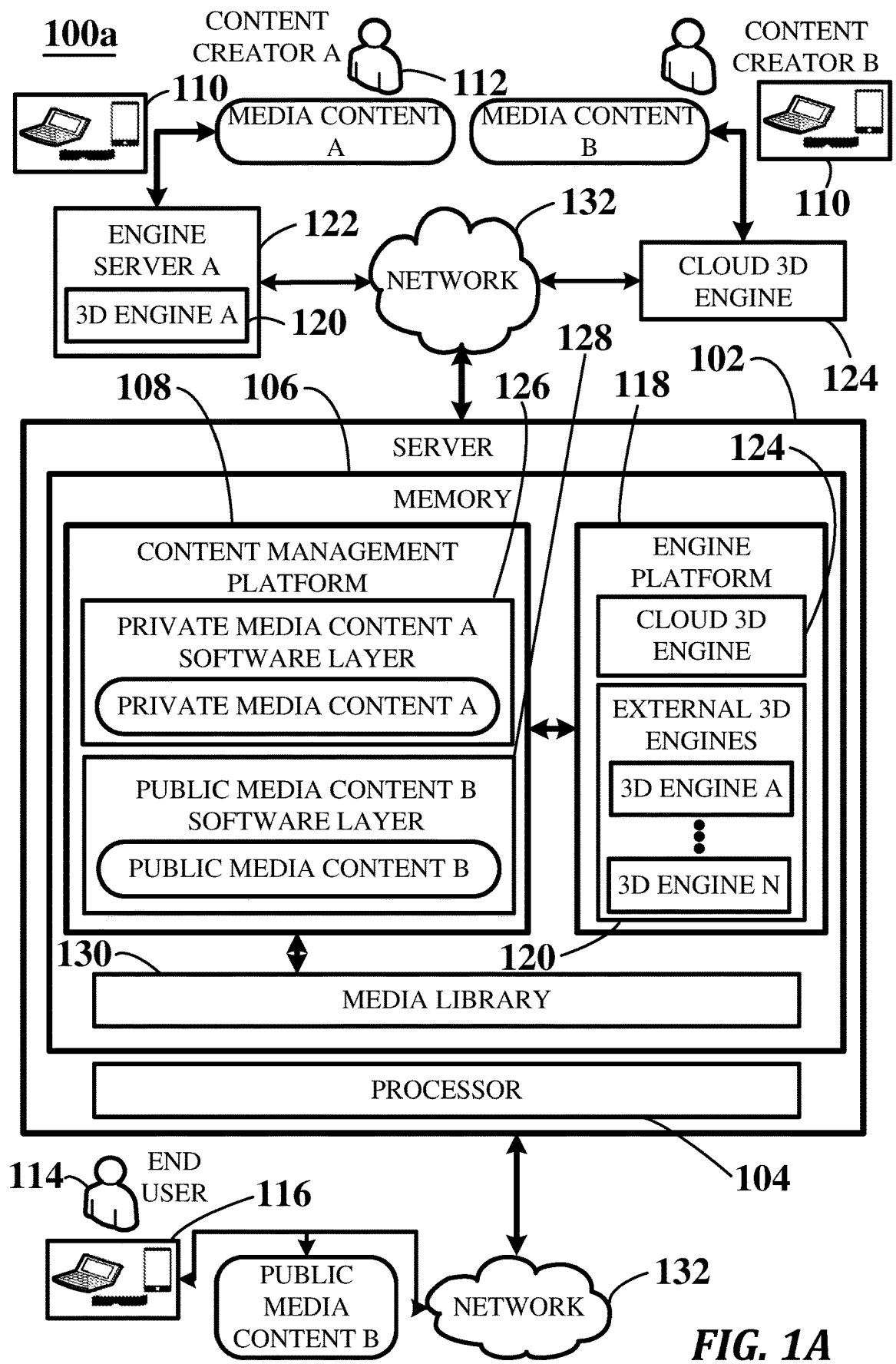
FIG. 1A to FIG. 1C depict schematic representations of systems enabling private to public media experiences, according to an embodiment.

FIG. 1A describes a schematic representation of a system 100a enabling private to public media experiences, according to an embodiment.

The system 100a comprises at least one server computer 102 of a server computer system comprising at least one processor 104 and storing in memory 106 a content management platform 108. The content management platform 108 receives a media content creation command through a content creator device 110 connected to the content management platform 108 through a network 132. Upon receiving the media content creation command, the content management platform 108 creates a media content instance that is visible and accessible only to the content creator device 110. When the content creator A 112 decides that the media content is ready for publishing, the content creator A 112 may, through the content creator device 110, send a publishing command that is received by the content management platform 108. Receiving the publishing command triggers the content management platform 108 to flag the virtual media content instance to enable the media content to be publicly visible and accessible to one or more end users 114 through one or more end user devices 116 connected to the content management platform 108.

In some embodiments, the media content item, which may be one or more of a digital audio, digital video, digital images, games, applications, and the like, may be configured to be viewed in any of augmented reality, virtual reality, or combinations thereof. Preferably, the media content may be a location-based media content that may be configured in one or more three-dimensional coordinates by being superposed on a real-world surface captured and/or stored in memory 106.

In the current disclosure, the content creator device 110 and the end user device 116 may refer to the same type of computing device configured to view and access the media content items available from the content management platform 108. However, for the purpose of clarity, the devices are referred to separately as "content creator device" or "end-user device" to separate the intention of the user as a content creator or editor and as a consumer of the media content, but in occasions where such separation may not be of the benefit of the description, they may be referred to simply as user devices. In some situations, the same user may be both a content creator and end-user of the same content or of content of other users, such as when the content creator has created a media content item, has published it, and then decides to consume the media content item as an end-user, or decides to consume the media content items of other content creators. The user devices may be one of a mobile device, personal computer, game console, media center, smart contact lenses, and head-mounted display, amongst others. The user devices may be equipped with sensors to determine a relative position and orientation of the user device (three coordinates) as well as a relative orientation of the headset (three angles) with respect to the viewer.

The sensing mechanisms mounted on the user devices may include a combination of inertial tracking sensing mechanisms and transceivers. The inertial tracking sensing mechanisms can make use of devices such as accelerometers and gyroscopes, which may be integrated in an inertial measuring unit (IMU). The transceivers may be implemented to send and receive radio communication signals to and from antennas. In an embodiment, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high QOS functionalities provided by mmW-based antennas may enable sub-centimeter or sub-millimeter positional and orientational tracking, which may increase accuracy when tracking the real-time position and orientation of the connected elements. In some embodiments, tracking may be implemented by employing several techniques known in the art, such as time of arrival (TOA), angle of arrival (AOA), or other tracking techniques known in the art (e.g., visual imaging, radar technology, etc.). In alternative embodiments, the sensing mechanisms and transceivers may be coupled together in a single tracking module device. The sensing mechanisms of the user devices may also include one or more cameras. For example, the cameras may be depth-cameras installed in the user devices. The cameras may be configured to capture and provide the viewing position and orientation of the user which determines the viewing position and orientation of the virtual frames that are sent via the engine platform server.

The media content instance may be a media content item comprising specific attributes, as defined by the media content creator 112 through the content management platform 108 during a media content creation process. The different attributes may be, for example, a published or private access right, and a view only or edit right. A media content item may thus be instantiated into one or more different instances, wherein each instance comprises a different attribute. The flag may be a binary flag that sets a new value to the media content instance to, for example, modify the access right attribute from private to public when the content creator sends the publishing command. Thus, when flagging the media content instance, a new value is assigned to the media content instance to give the instance a published attribute that enables other users to view and access the media content item.

In some embodiments, the at least one server computer 102 further stores in memory 106 an engine platform 118 configured to host one or more external 3D engines 120, e.g., external 3D engines A-N from corresponding external engine servers 122 (e.g., engine server A) and at least one cloud 3D engine 124. The media content may be created through either of the external 3D engines 120 or the cloud 3D engine 124, and then, if published, made available to end-user devices 116 through the content management platform 108 that may be accessed by end users 114 through the network 132. Hence, the content management platform 108 serves as a way for content creators 112 and end users 114 to view and access media content, while the engine platform 118 serves for creating the media content that is shared in the content management platform 108 by enabling the hosting and access by content creators 112 and end users 114 of a plurality 3D engines 120.

The 3D engines (e.g., external 3D engines 120 and at least one cloud 3D engine 124) available at the engine platform 118 may offer an environment created specially to implement the functionalities that are specific to the media content items to be developed. Thus, the 3D engines perform tasks that enable implementation of aspects such as the management of an animated model, the collisions between objects, the behavior and interaction of light with individual objects and between the objects of the scene, and the interaction between users and the media content items. The 3D engines may include, for example, a physical engine to simulate physical laws within the virtual environment, an audio engine to add music and complex acoustical effects, or an artificial intelligence (AI) engine to program computer intelligence behaviors. The 3D engines may be used in any type of media content item that uses rendering of 3D graphics at a real-time performance, including applications in VR, AR, or combinations thereof.

In some embodiments, the engine platform 118 is further configured to request virtual frames from the one or more 3D engines, such as from the cloud 3D engine 124 or one or more external 3D engines 120. The engine platform 118 then receives the virtual frames sent by the one or more 3D engines and composites the virtual frames into a unified media stream view of the at least one media content, enabling the one or more end user devices 116 to receive and access a unified media stream view comprising published media content. In some embodiments, compositing of the virtual frames in order to generate one single media stream view for users may include sorting virtual frames or virtual frame sprites in 3D space; culling (e.g., viewport culling) of virtual frames in 3D space; performing depth-masking of virtual frames in order to enable partial blocking of the virtual frames based on the real world elements; requesting ingredients of virtual frames; and combining the virtual frames into one view. Alternatively, compositing of the virtual frames may include fewer or additional steps, in any combination. In some embodiments, when external engine servers 122 send their corresponding portions of the virtual frames, the external 3D engines 120 engines may render these virtual frame portions so that the virtual frames received by the engine platform 118 are already rendered.

In the current disclosure, the term "virtual frame" refers to one of the many elements (e.g., still images) that compose a virtual animation, which may be included in a media stream conveying the digital content of the digital reality application. For example, the virtual frames may be virtual sprites, or two-dimensional bitmaps that are integrated into one larger scene. When the virtual animation is displayed, each virtual frame is flashed to users on the pre-determined locations for a short time. The position and orientation at which the virtual frames are displayed to users depend on the viewing position and orientation of the users, which may be sensed by sensors installed in the user devices. The plurality of virtual frames may be composited in order to generate a unified media stream to the user device that may be viewed and interacted with by a user. The media stream may include digital reality content including 3D image data, 3D geometries, 3D entities, 3D sensory data, 3D dynamic objects, video data, audio data, textual data, time data, positional data, orientational data, haptic data, and lighting data, amongst others.

In some embodiments sorting of virtual frames in 3D space refers to arranging the different elements of the virtual frame into a specific position and orientation in 3D space so that the media stream that will result from the animated virtual frames may be adjusted to the viewing position and orientation of the user.

In some embodiments, viewport culling of the virtual frames in 3D space may remove unnecessary elements from the view frustum of the virtual frame. The elements may be deemed unnecessary because, for example, they may lie completely outside the viewing frustum from the virtual frame, or they may be blocked by real world elements.

In some embodiments, depth-masking refers to the process of performing a partial blocking of some portions of the virtual frame, especially portions located in the background that may affect the depth of the image displayed on the virtual frame. Depth-masking may be performed employing several techniques known in the art, such as layer masking, clip masking, and alpha-channel masking, amongst others. In some embodiments, depth-masking is performed on geometries that are already available in a database or data structure stored in the engine platform server system and/or from virtual replicas of real world elements stored in the persistent virtual world system. In other embodiments, the depth-masking is performed on geometries that are generated in real-time by the engine platform server.

In some embodiments, requesting ingredients of the virtual frames refers to retrieving the actual content of virtual frames corresponding to the digital reality applications which will be part of the unified media stream.

In some embodiments, combining the virtual frames into one media stream view is performed by one or more of warping, stitching and interpolating the plurality of virtual frames, amongst others In some embodiments, when the media content is created through the cloud 3D engine 124, after receiving the publishing command, the cloud 3D engine 124 is configured to place the created media content, depicted as private media content A, in a private media content software layer 126 that is only visible to the content creator device 110. In these embodiments, flagging the instance sends the private media content to a public media content software layer for end users to view and access the media content through corresponding end user devices 116.

In other embodiments, when the media content is created through the cloud 3D engine 124, the cloud 3D engine 124 is configured to place the created media content in a public media content software layer 128 and render the media content invisible for end user devices. In these embodiments, flagging the instance renders the media content visible for other end user devices. Flagging the specific media content in the public media content software layer 128 modifies the cloud 3D engine 124 rendering commands to be applied to the corresponding media content or content list from invisible to visible to effectively achieve the desired visible rendering mode, thus making the media content visible for other end user devices.

In some embodiments, the content management platform 108 enables end user devices 116, which would act as other content creator devices 110, to edit the published media content synchronously or asynchronously through the one or more external 3D engines 120 or cloud 3D engines 124, enabling co-creation of media content.

In some embodiments, the content management platform 108 of system 100a may connect to a media library 130 hosted on the server computer 102 and may share the media content items with the media library 130, where content creators and end-users may view, access, and if allowed, edit the published media content.

Figure 1B:
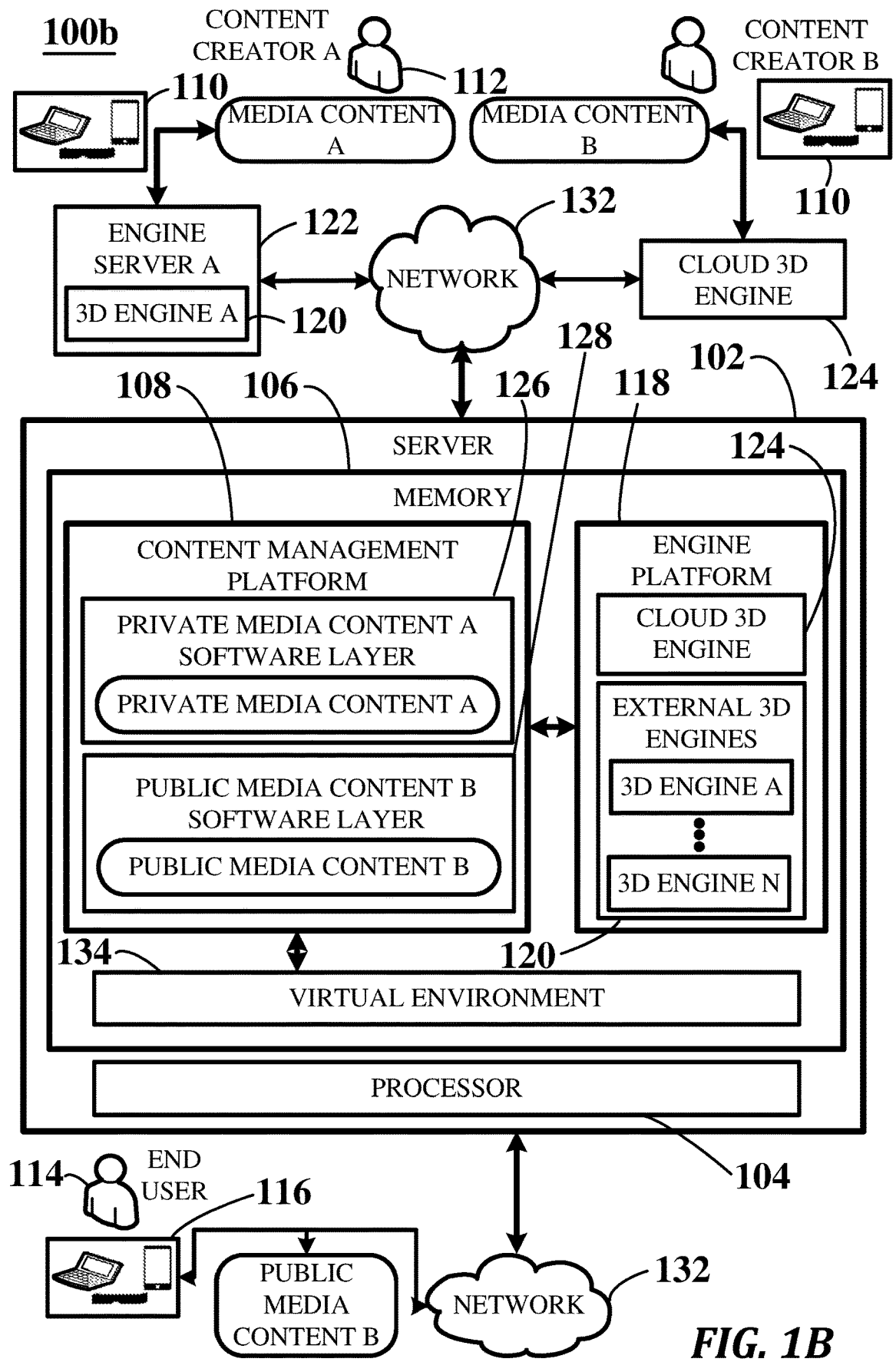

FIG. 1B depicts a schematic representation of a system 100b enabling private to public media experiences, according to an embodiment.

System 100b comprises the same elements as system 100a with the exception that the content management platform 108 shares the media content items to a virtual environment 134. In these embodiments, the publicly visible and accessible media content is positioned in one or more three-dimensional coordinates of the virtual environment 134, which may be accessed by content creators 112 or end users 114 through their corresponding user devices, such as through virtual reality devices or by viewing the content in a "flat" screen, such as a computer, mobile device or TV screen. Thus, for example, both content creators 112 and end users 114 accessing the content management platform 108 may access the media content as an added element of the virtual environment 134 to be viewed flat (e.g., as 2D content or rendered 3D content on a flat screen) or in virtual reality, enabling them to edit and interact with the media content independent of the 3D engine through which the media content was created and of the external engine server 122 where the 3D engine is hosted. Furthermore, content creators 112 may view in real-time where the media content is positioned virtually in the virtual environment and may decide, through the techniques disclosed in the current disclosure, when to publish the media content for enabling access to other users.

Figure 1C:
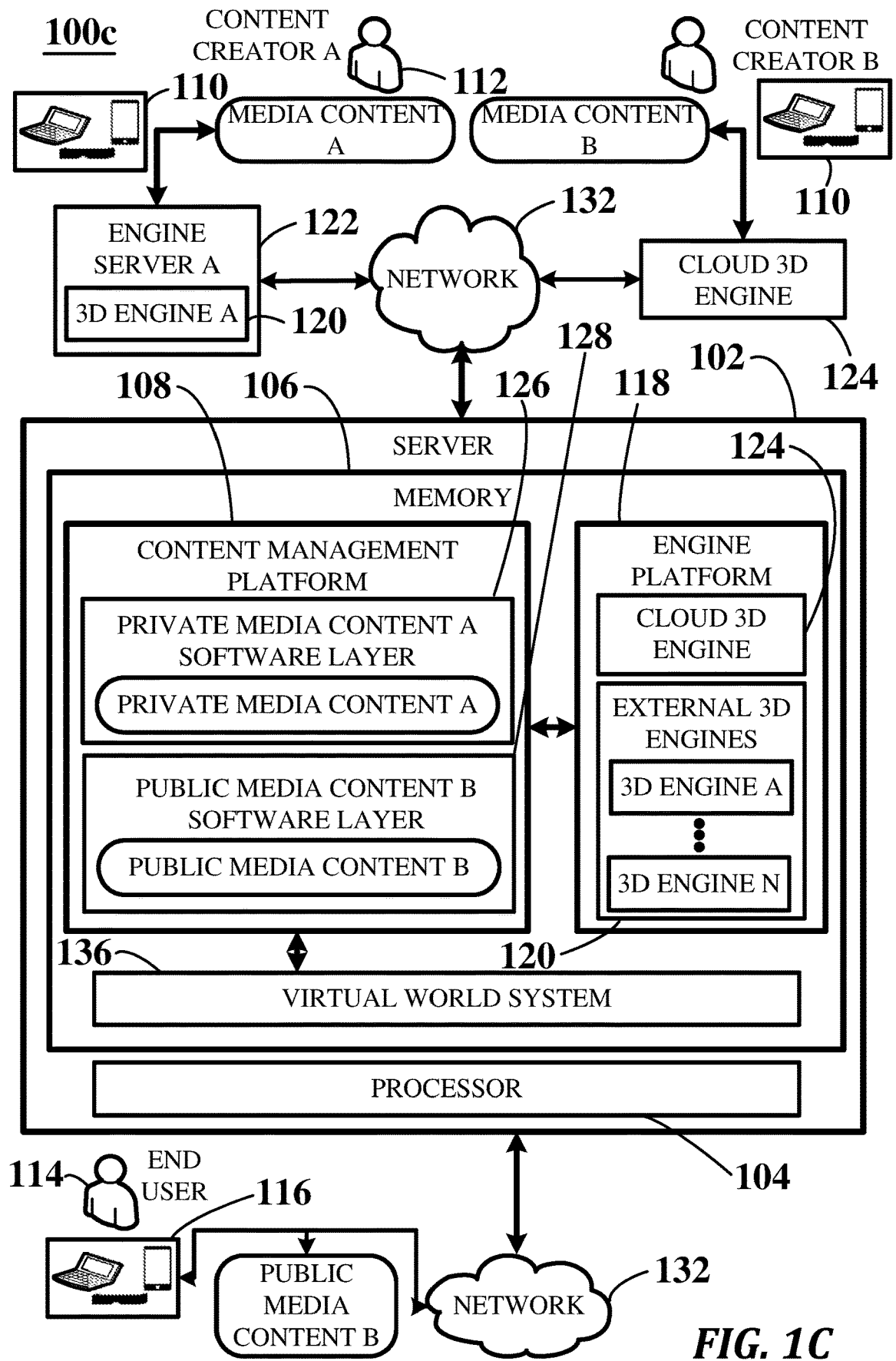

FIG. 1C depicts a schematic representation of a system 100c enabling private to public media experiences, according to an embodiment.

System 100c comprises the same elements as system 100a with the exception that the content management platform shares the media content items to a virtual world system 136. In these embodiments, the publicly visible and accessible media content is positioned in one or more three-dimensional coordinates of the virtual world system 136. Thus, for example, both content creators 112 and end users 114 accessing the content management platform 108 may access the media content as an added element of reality to be viewed in augmented reality or virtual reality, enabling them to edit and interact with the media content independent of the 3D engine through which the media content was created and of the external engine server 122 where the 3D engine is hosted. Furthermore, content creators 112 may view in real-time where the media content is positioned virtually in the real world and may decide, through the techniques disclosed in the current disclosure, when to publish the media content for enabling access to other users.

Systems 100a-c may use a cloud to edge infrastructure that may implement distributed computing capabilities, comprising employing public or private clouds, distributed ledger-based infrastructure, cloudlets and edge systems, such as enterprise systems, mobile platforms, and user devices. The distributed ledger-based infrastructure may be a decentralized and immutable blockchain or distributed ledger network that facilitates the transfer and storage of data to widely distribute the content media platform persistent virtual world system, including virtual replicas, applications, and any event or interaction. Through the cloud to edge infrastructure, resources including physical servers and network equipment enable a shared storage and computing that may allow for a dynamic allocation thereof depending on factors such as the distance of the user to the resources and the network and computational demand from the users relative to each other and to the locational positions they are, commanding more or less compute accordingly. In some embodiments, the dynamic allocation of storage and computing is codified into smart contracts using the distributed ledger infrastructure, automating the transactional logic (e.g., the computer logic behind each allocation of storage and computing) and the consequences or results of such allocation.

In some embodiments, in order to reduce hardware and network demands, contribute to the reduction of network latency, and improve the user experience, the system may connect through a network 132 including millimeter-wave (mmW) or combinations of mmW and sub 6 GHz communication systems, such as through 5th generation wireless systems communication (5G). In other embodiments, the system may connect through wireless local area networking (Wi-Fi) providing data at 60 GHz. Provided communication systems may allow for low latency and high Gbps downlink speeds to end points in the field, complying with parameters for executing the typically highly interactive media content items, such as digital reality applications or other highly-demanding applications. This results in high-quality, low latency, real-time digital application content streaming. In other embodiments, the system may communicatively connect through 4th generation wireless systems communication (4G), may be supported by 4G communication systems, or may include other wired or wireless communication systems.

In other embodiments, global navigation satellite systems (GNSS), which refers generally to any satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In some embodiments, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

Figure 2:
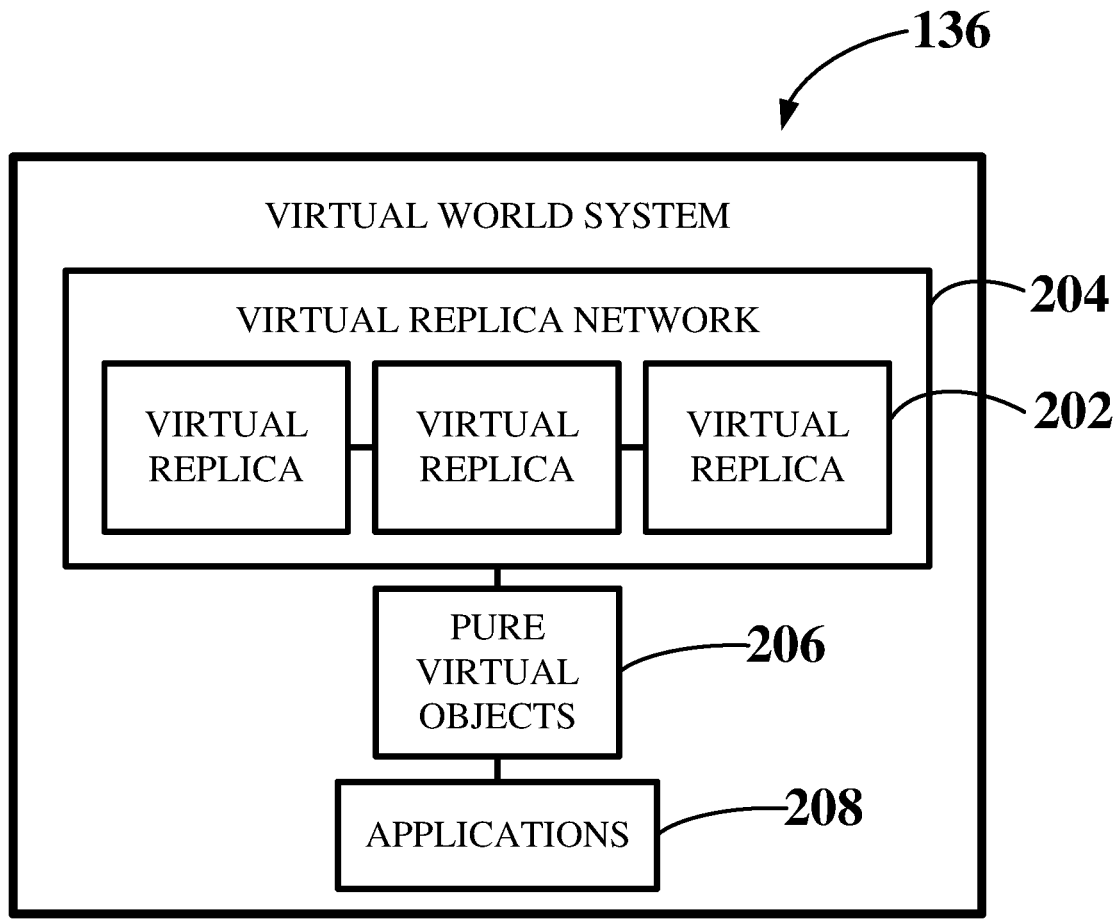
FIG. 2 depicts a schematic representation of a virtual world system, according to an embodiment.

FIG. 2 describes a schematic representation of a virtual world system 136, according to an embodiment, which may be stored in memory 106 of the at least one server computer 102.

The virtual world system 136 comprises one or more virtual replicas 202 of real-world elements. A plurality of connected virtual replicas 202 form a virtual replica network 204, which enable the establishment of peer-to-peer (P2P) connections either through direct physical communications or through indirect virtual replica-based connections. The virtual world system 136 may further store pure virtual objects 206 not available in the real world and applications 208 that can be positioned in various parts of the world. The pure virtual objects 206 and the applications 208 are media content items that may be developed through the one or more external 3D engines 120 or cloud 3D engine 124, as depicted with reference to FIG. 1A-FIG. 1C.

In the current disclosure, the term "virtual replica" refers to accurate and persistent virtual representations of real-world elements. In an embodiment, the virtual replicas 202 of the current disclosure refer to a virtual version, or virtual twin, of a real-world element, or real twin, which may either be mapped or modeled through computer assisted drawing (CAD) or computer-assisted engineering (CAE) methods, input by computer models of the real objects (e.g., building information models—BIMs) or other suitable methods, and which may mirror not just the appearance but also the behavior of the real twin. For example, the virtual replicas may be developed through CAE methods available through the one or more external 3D engines 120 or cloud 3D engine 124, as depicted with reference to FIG. 1C. The real-world objects may additionally include sensors that can provide the virtual replicas 202 with multi-source input data for enriching and synchronizing the virtual replicas 202 with their respective real counterpart. Thus, virtual replicas 202 may obtain data from one or more sources (e.g., from one or more real-world objects, environmental sensors, computing devices, etc.). As used herein, the term "multi-source data" refers to data that may be obtained from multiple sources.

In some embodiments, the virtual replicas include logic, virtual data and/or models that may be input through a plurality of software platforms, software engines, and/or sensors connected to connected devices. In the current disclosure, logic refers to rules that define the operational instructions and behavior embedded in computer code, which may be used for the programming of virtual replicas or applications available in the persistent virtual world system. Virtual data are the attributes of the virtual replicas, and the models are the graphical, mathematical, and/or logic representations of any aspect of the corresponding real-world element, which may be defined and governed through the comprised logic.

In some embodiments, the virtual world system 136 further comprises other media content items, such as applications that users may interact with through user devices. The applications can be, for example, distributed applications using a distributed cloud to edge infrastructure of the current disclosure. The applications can assist in defining the type of interaction that users can have with the elements of the persistent virtual world system, such as enabling an interactive game-like mechanics with virtual replicas or avatars of other users in the virtual world system 136. The applications can be available at an application library stored in the memory of the server or from external sources, such as through external application libraries connected to the server and providing applications to the virtual world system 136.

Figure 3A:
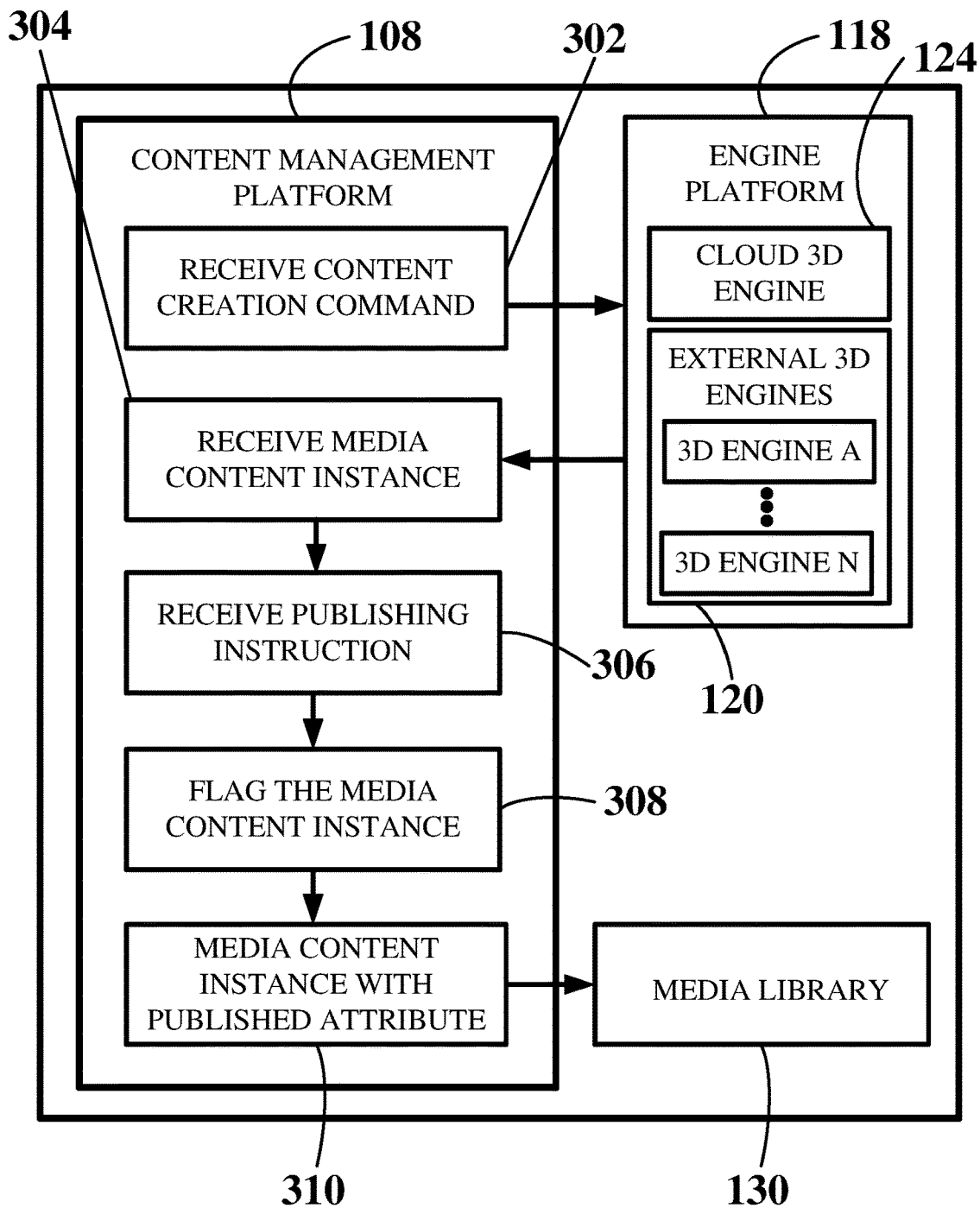
FIG. 3A to FIG. 3C show schematic representations of process flows of FIG. 1A to FIG. 1C enabling private to public media experiences.
Figure 3B:
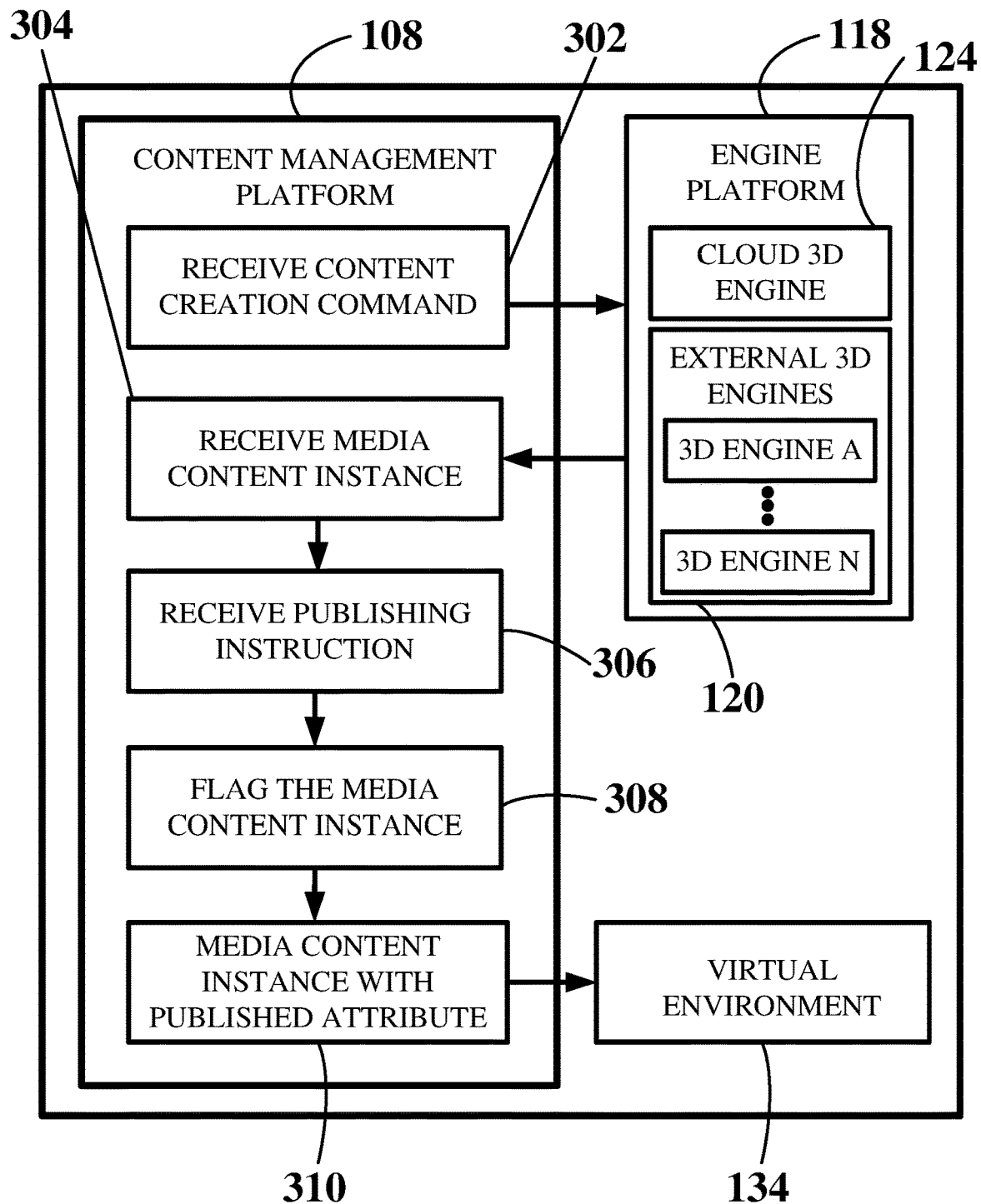
Figure 3C:
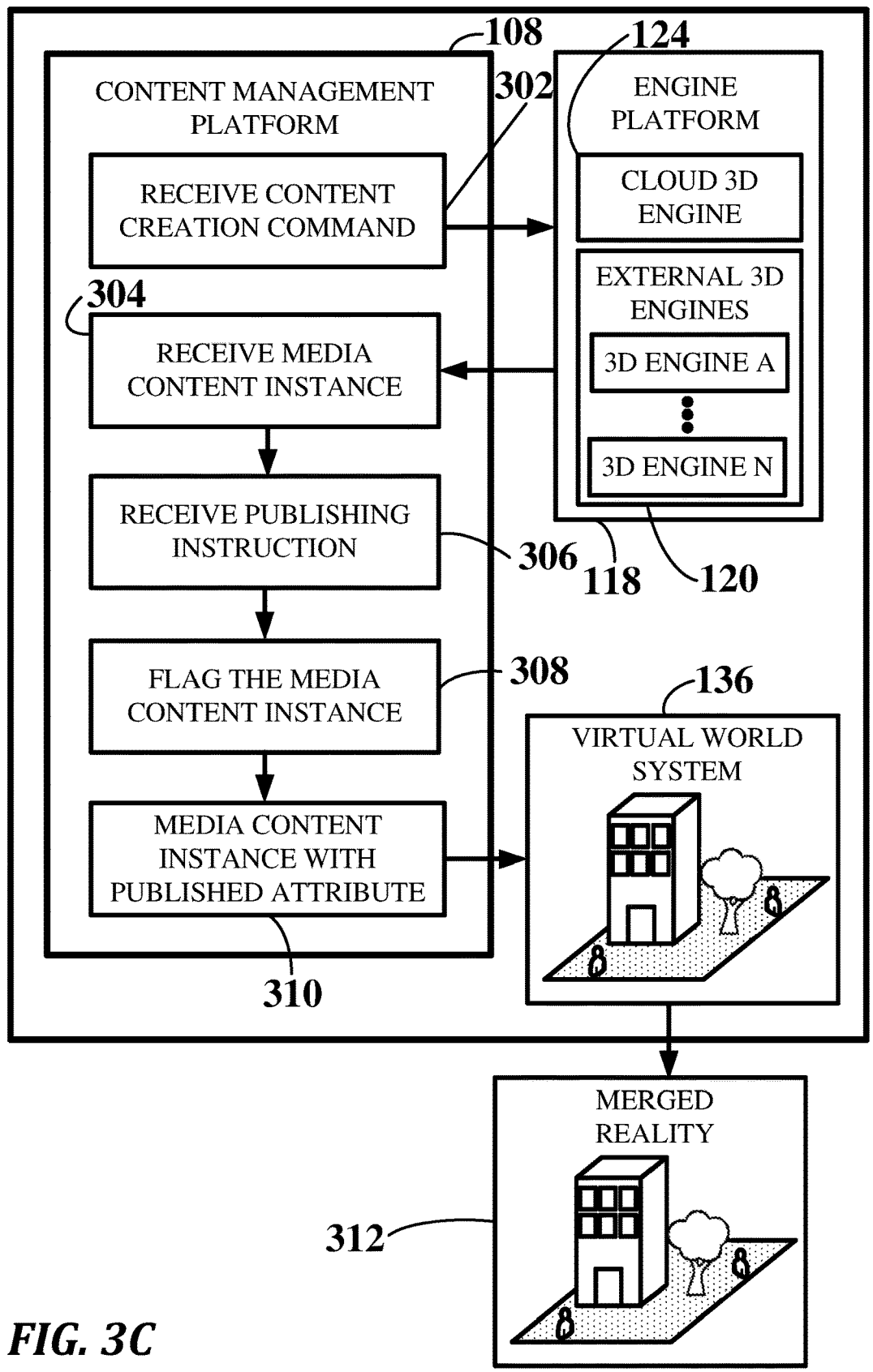

FIG. 3A to FIG. 3C show schematic representations of process flows 300a-300c of systems 100a-100c of FIG. 1A to FIG. 1C.

In FIG. 3A, process flow 300a begins by the content management platform 108 receiving a content creation command 302, accessing the engine platform 118 for creating the media content items through either of the cloud 3D engine 124 or external 3D engines 120 connected to the engine platform through corresponding application programming interfaces (APIs) and software development kits (SDKs). Once a media content item is created, the media content item is instantiated into a media content instance, and the content management platform 108 receives the media content instance 304. The content management platform 108 then receives a publishing instruction 306, triggering the content management platform 108 to flag the media content instance 308, generating a media content instance with published attribute 310 that is shared with a media library 130 for the consumption of other content creators or end-users.

In FIG. 3B, process flow 300b begins by the content management platform 108 receiving a content creation command 302, accessing the engine platform 118 for creating the media content items through either of the cloud 3D engine or external 3D engines connected to the engine platform through corresponding application programming interfaces (APIs) and software development kits (SDKs). Once a media content item is created, the media content item is instantiated into a media content instance, and the content management platform 108 receives the media content instance 304. The content management platform 108 then receives a publishing instruction 306, triggering the content management platform 108 to flag the media content instance 308, generating a media content instance with published attribute 310 that is shared with a virtual environment 134 for the consumption of other content creators or end-users.

In FIG. 3C, process flow 300c begins by the content management platform 108 receiving a content creation command 302, accessing the engine platform 118 for creating the media content items through either of the cloud 3D engine or external 3D engines connected to the engine platform through corresponding application programming interfaces (APIs) and software development kits (SDKs). Once a media content item is created, the media content item is instantiated into a media content instance, and the content management platform 108 receives the media content instance 304. The content management platform 108 then receives a publishing instruction 306, triggering the content management platform 108 to flag the media content instance 308, generating a media content instance with published attribute 310 that is shared with a virtual world system 136 for the consumption of other content creators or end-users. Users may view the published media content in the virtual world system 136 in a merged reality 312, such as in augmented reality, virtual reality, or combinations thereof, where at least some elements are virtual representations of or are the actual real elements in the real world.

Figure 4A:
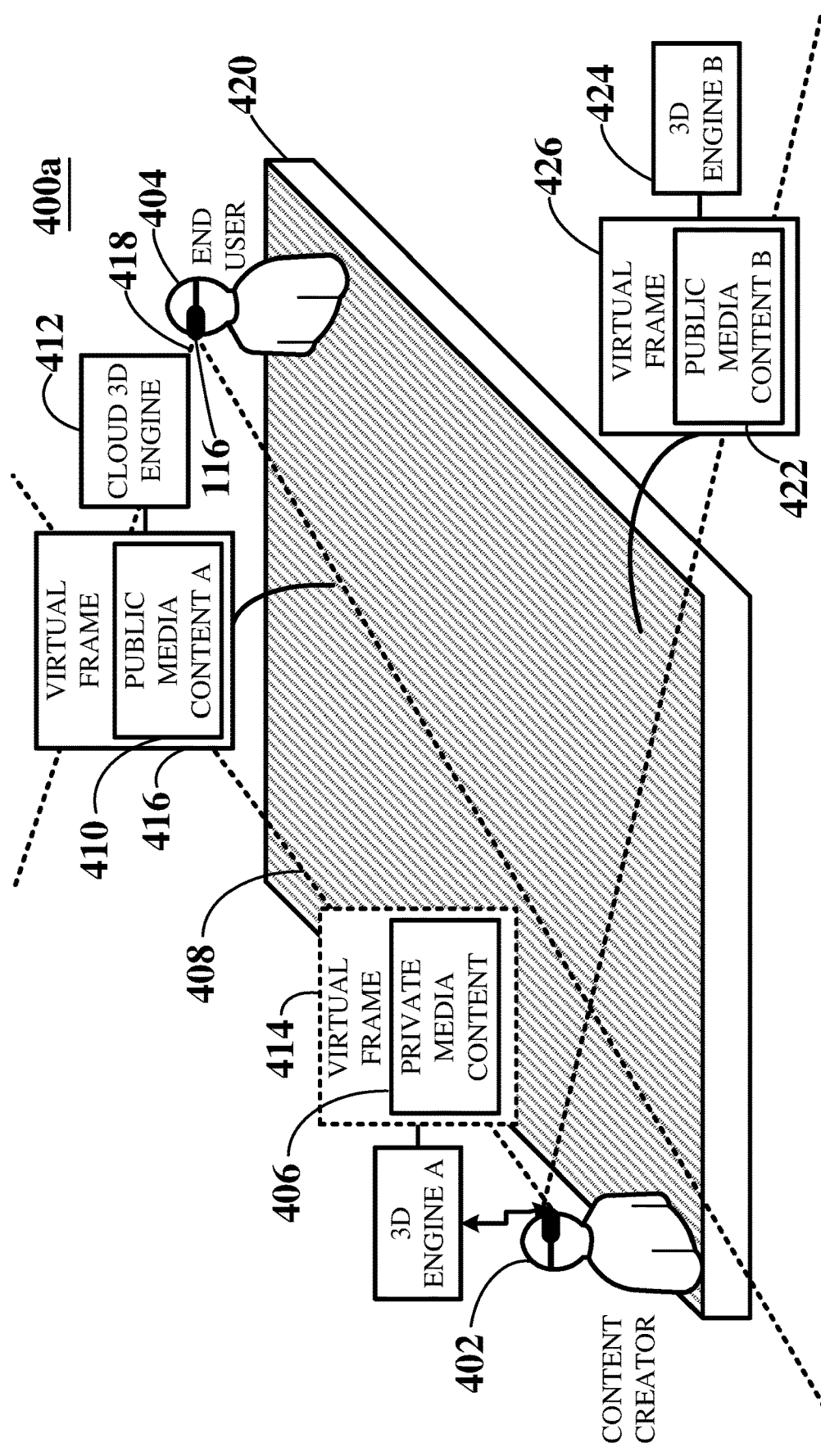
FIG. 4A to FIG. 4B depict schematic representations of a mixed reality environment where content creators and end users view and access media content, according to an embodiment.
Figure 4B:
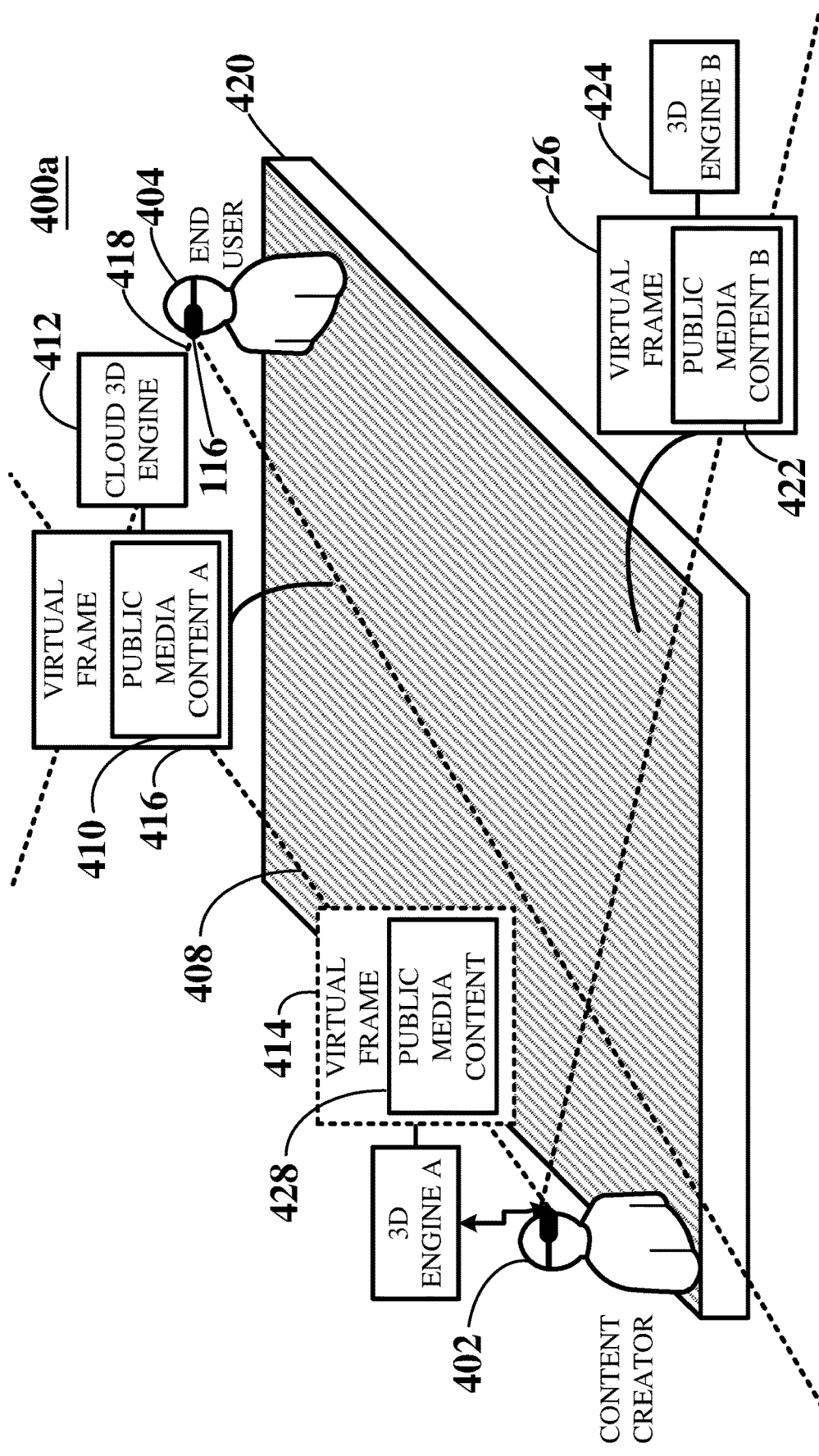

FIG. 4A to FIG. 4B describe schematic representations of a mixed reality environment 400 where content creators 402 and end-users 404 view and access media content, according to an embodiment.

In FIG. 4A, the mixed reality environment 400 comprises a content creator 402 and an end-user 404 interacting with media content. More specifically, the content creator 402 creates private media content 406 through a 3D engine A accessed through, for example, the engine platform 118 of FIG. 1A to FIG. 1C and FIG. 3A to FIG. 3C. The private media content 406 is at this stage visible only to the content creator 402, as depicted by the dotted lines representing the field of view 408 of the content creator 402. The content creator 402 may be further enabled to view public media content A 410. In order to view the media content from both 3D engine A and the cloud 3D engine 412, the engine platform receives the virtual frames (e.g., private virtual frames 414 and public virtual frames 416) sent by 3D engine A and the cloud 3D engine 412, respectively, and composites the virtual frames into a unified media stream view of the at least one media content. The end-user 404 views only the public media content A, as depicted by the dotted lines representing the field of view 418 and may, if enabled, edit the media content. The media content may be positioned in a 3D coordinate of the virtual space 420 of the virtual world system, and the content creator 402 and end-user 404 may view the corresponding media content in any of augmented reality, virtual reality, or combinations thereof. The virtual space 420 of the virtual world system further comprises public media content B 422 developed through 3D engine C 424, the virtual frames 426 of which are not sent to any of the user devices of the content creator 402 or the end-user 404 because of not being within the fields of view 408/418 of any of them.

FIG. 4B comprises the same elements as FIG. 4A, with the exception that the content creator 402 has published the media content, represented as public media content 428, which is now visible to the end-user 404. Said publishing may be performed through different methods of the current disclosure, as described with reference to FIG. 1A.

Figure 5:
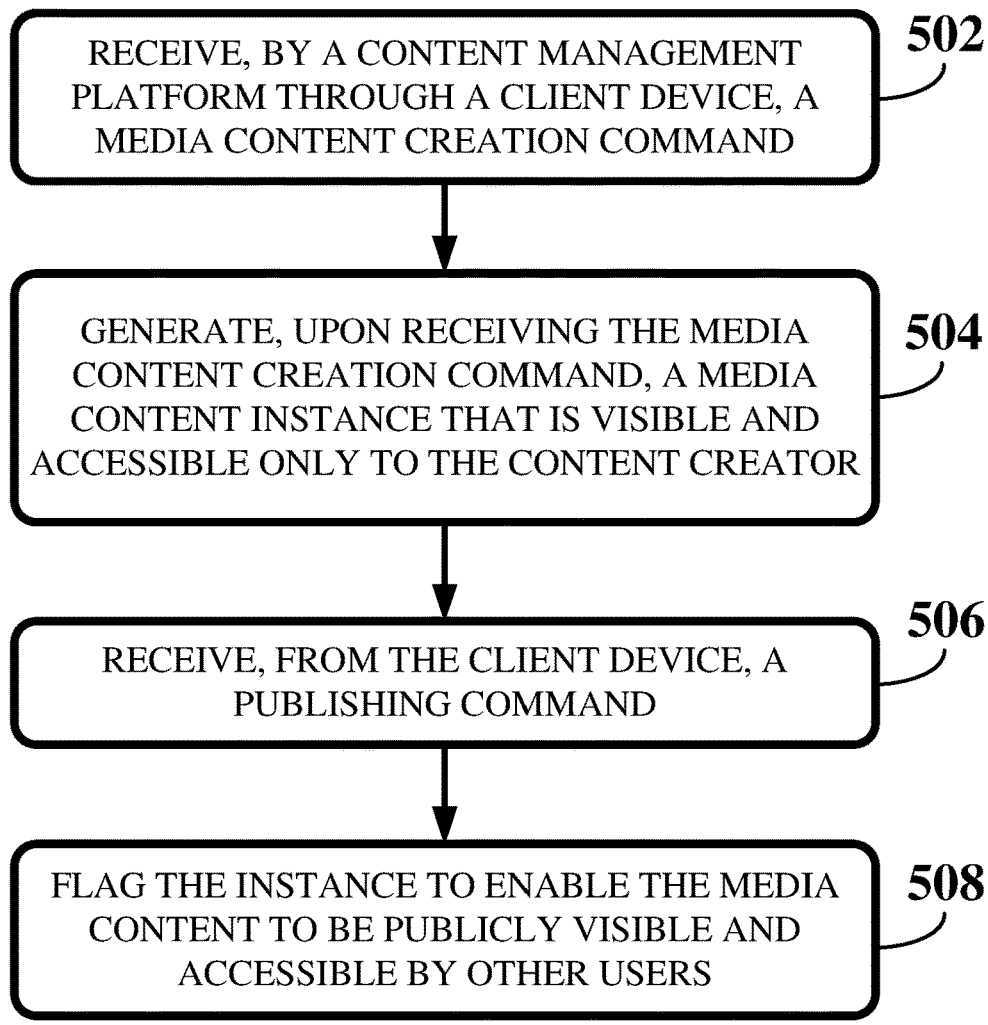
FIG. 5 depicts a block diagram of a method enabling private to public media experiences, according to an embodiment.

FIG. 5 describes a block diagram of a method 500 enabling private to public media experiences, according to an embodiment. Method 500 may be implemented by at least one server computer comprising at least one processor and storing in memory a content management platform, as described with reference to FIG. 1A to FIG. 1C.

Method 500 begins in step 502 by receiving, by a content management system through a user device, such as a content creator device, a media content creation command. In step 504, method 500 proceeds by generating, upon receiving the media content creation command, a media content instance that is visible and accessible only to the content creator. As described with reference to FIG. 1A to FIG. 1C, the media content may be created through either of the external 3D engines 120 or the cloud 3D engine 124 hosted at the engine platform 118. Thus, receiving the media content creation command gives access to the user device for editing the media content through the engine platform connected to the media content management platform.

Then, in step 506, method 500 continues by receiving, from the user device, a publishing command. Such a publishing command may be input by the content creator when the media content is ready for being viewed and/or edited by others. Thus, in the initial stages of the development of the media content, the content creator may keep the media content item completely private.

Finally, in step 508, method 500 ends by flagging the instance to enable the media content to be publicly visible and accessible by other users. Flagging the instance sets a new value to the media content instance to modify an access right attribute from private to public.

In some embodiments, the method 500 further comprises the engine platform performing the steps of requesting virtual frames from the one or more 3D engines; receiving virtual frames sent by the one or more 3D engines; and compositing the virtual frames into a unified media stream view of the at least one media content. Such a compositing of the virtual frames into a unified media stream enables the one or more end user devices to view the unified media stream view comprising published media content from at least one external or cloud 3D engines.

In some embodiments, the method 500 further comprises placing the created media content in a private media content software layer that is only visible to the creator user device; flagging the instance; and activating the private media content software layer, making the created media content public for access and view to end user devices.

In some embodiments, the method 500 further comprises, when the media content is created through the cloud 3D engine, rendering the media content invisible for end user devices; placing the created media content in a public media content software layer; and, after flagging the instance, rendering the media content visible for end user devices. Flagging the specific media content in the public media content software layer modifies the cloud 3D engine rendering commands to be applied to the corresponding media content or content list from invisible to visible to effectively achieve the desired visible rendering mode, thus making the media content visible for other end user devices.

In some embodiments, the method 500 further comprises sharing the media content with a media library, or positioning the media content in a 3D coordinate of a virtual environment, or positioning the media content in a 3D coordinate of a virtual world system connected to the content management platform.

As used herein, the term "computer readable medium" includes volatile and nonvolatile and removable and nonremovable media implemented in any method or technology capable of storing information, such as computer readable instructions, data structures, program modules, or other data. In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system of enabling private to public media experiences, comprising:
at least one server computer storing in memory a content management platform, the content management platform configured to:
receive a media content creation command sent from a content creator device connected to the content management platform through a network;
in response to receiving the media content creation command, generating a media content instance that is visible to and accessible by the content creator device but is not visible to or accessible by one or more other end user devices connected to the content management platform;
generating an additional media content instance that is publicly visible;
displaying the media content and the additional media content as added elements in a virtual world system;
receive, from the content creator device, a publishing command; and
flag the media content instance to enable the media content instance to be publicly visible to and accessible by the one or more other end user devices.

2. The system of claim 1, wherein the at least one server computer further stores in memory an engine platform configured to host one or more 3D engines that include at least one of an external 3D engine from a corresponding external engine server and a cloud 3D engine, wherein the media content instance is created using at least one of the one or more 3D engines.

3. The system of claim 2, wherein the engine platform is further configured to:

request virtual frames from at least one of the one or more 3D engines;
receive the virtual frames sent by at least one of the one or more 3D engines; and
composite the virtual frames into a unified media stream view including the media content instance for presentation by at least the one or more other end user devices.

4. The system of claim 2, wherein the engine platform is further configured to:
place the media content instance in a private media content software layer that is visible to the content creator device but not the one or more other end user devices; and
in response to detecting the flagging of the media content instance, move the media content instance to a public media content software layer to make the media content instance publicly visible to and accessible by the one or more other end user devices.

5. The system of claim 2, wherein the engine platform is further configured to:
render the media content instance invisible for the one or more other end user devices in a public media content software layer; and
in response to detecting the flagging of the media content instance, rendering the media content instance visible for the one or more other end user devices.

6. The system of claim 2, wherein the content management platform enables at least one of the one or more other end user devices to edit the media content instance synchronously or asynchronously through the one or more 3D engines of the engine platform to enable co-creation of media content.

7. The system of claim 1, wherein the content management platform shares the media content instance with a media library, or positions the media content instance in a 3D coordinate of a virtual environment, or positions the media content instance in a 3D coordinate of the virtual world system connected to the content management platform.

8. The system of claim 7, wherein the virtual world system includes a plurality of virtual objects;
wherein the virtual objects include virtual data and models;
wherein the models comprise one or more of a 3D model, a dynamic model, a geometric model, and a machine learning model; and
wherein the models consider a level of detail specified by a specific scenario computation.

9. The system of claim 1, wherein the media content instance is viewed in an augmented reality presentation or a virtual reality presentation.

10. A method enabling private to public media experiences, comprising:
receiving, by at least one server computer of a content management platform, a media content creation command sent through a content creator device connected to the content management platform through a network;
in response to receiving the media content creation command, generating a media content instance that is visible to and accessible by the content creator device but is not visible to or accessible by one or more other end user devices connected to the content management platform;
generating an additional media content instance that is publicly visible;
displaying the media content and the additional media content as added elements in a virtual world system;
receiving, from the content creator device, a publishing command; and
flagging the media content instance to enable the media content instance to be publicly visible to and accessible by the one or more other end user devices.

11. The method of claim 10, further comprising hosting, by the at least one server computer, one or more 3D engines that include at least one of an external 3D engine from a corresponding external engine server and a cloud 3D engine;
wherein the media content instance is created using at least one of the one or more 3D engines.

12. The method of claim 11, further comprising:
requesting virtual frames from at least one of the one or more 3D engines;
receiving the virtual frames sent by at least one of the one or more 3D engines; and
compositing the virtual frames into a unified media stream view including the media content instance for presentation by at least one of the one or more other end user devices.

13. The method of claim 11, further comprising:
placing the media content instance in a private media content software layer that is visible to the content creator device but not the one or more other end user devices; and
in response to detecting the flagging of the media content instance, activating the private media content software layer to make the media content instance visible to and accessible by the one or more other end user devices.

14. The method of claim 11, further comprising:
rendering the media content instance invisible for the one or more other end user devices;
placing the media content instance in a public media content software layer; and
in response to detecting the flagging of the media content instance, rendering the media content instance visible to the one or more other end user devices.

15. The method of claim 11, further comprising enabling, by the at least one server computer, the one or more other end user devices to edit the media content instance synchronously or asynchronously through the one or more 3D engines to enable co-creation of media content.

16. The method of claim 11, further comprising sharing the media content instance with a media library, or positioning the media content instance in a 3D coordinate of a virtual environment, or positioning the media content instance in a 3D coordinate of the virtual world system.

17. The method of claim 16, wherein the virtual world system includes a plurality of virtual objects;
wherein the virtual objects include virtual data and models;
wherein the models comprise one or more of a 3D model, a dynamic model, a geometric model, and a machine learning model; and
wherein the models consider a level of detail specified by a specific scenario computation.

18. At least one non-transitory computer-readable medium having stored thereon computer code configured to cause at least one server computer to perform actions comprising:
receiving, by at the least one server computer of a content management platform, a media content creation command sent through a content creator device connected to the content management platform through a network;
in response to receiving the media content creation command, generating a media content instance that is visible to and accessible by the content creator device but is not visible to or accessible by one or more other end user devices connected to the content management platform;

generating an additional media content instance that is publicly visible;

displaying the media content and the additional media content as added elements in a virtual world system;

receiving, from the content creator device, a publishing command; and flagging the media content instance to enable the media content instance to be publicly visible to and accessible by the one or more other end user devices.

19. The at least one non-transitory computer-readable medium of claim 18, further comprising hosting, by the at least one server computer, one or more 3D engines that include at least one of an external 3D engine from a corresponding external engine server and a cloud 3D engine;

wherein the media content instance is created using at least one of the one or more 3D engines.

20. The at least one non-transitory computer-readable medium of claim 19, further comprising enabling, by the at least one server computer, the one or more other end user devices to edit the media content instance synchronously or asynchronously through the one or more 3D engines to enable co-creation of media content.

* * * * *